Oct. 25, 1966  E. H. SHEFTELMAN  3,281,601
CATHODE RAY TUBE DEVICE FOR TRACKING LIGHT SPOT ON TUBE FACE
Filed Oct. 11, 1963  2 Sheets-Sheet 1
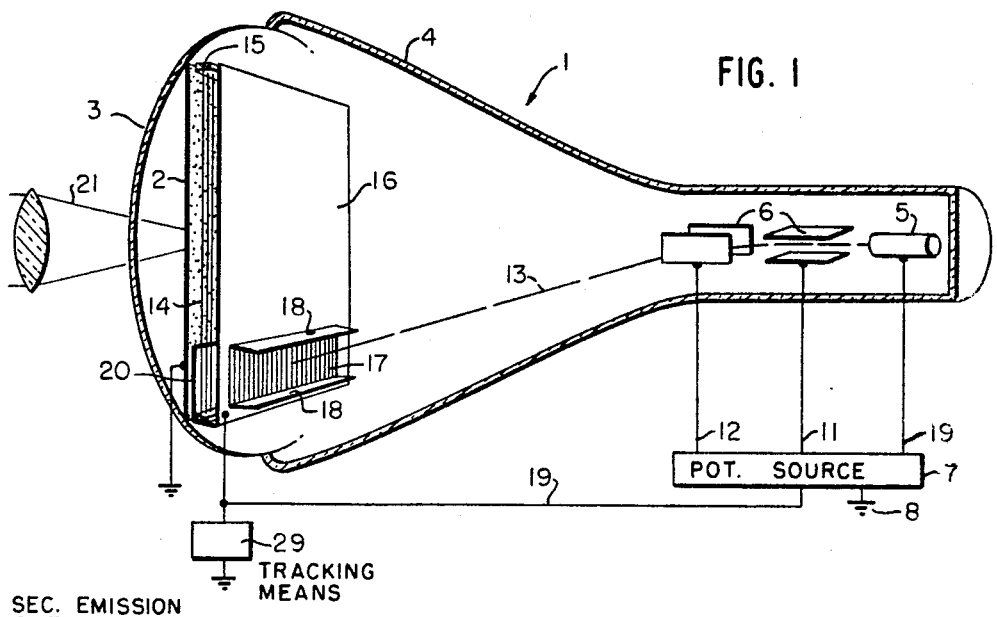
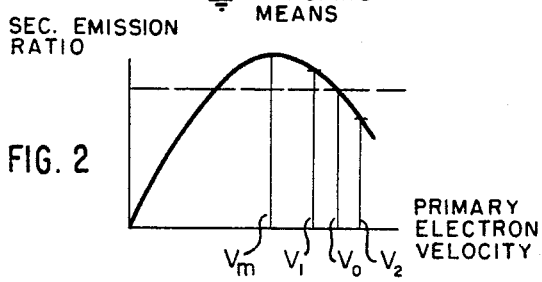
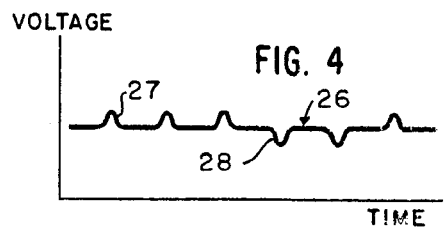
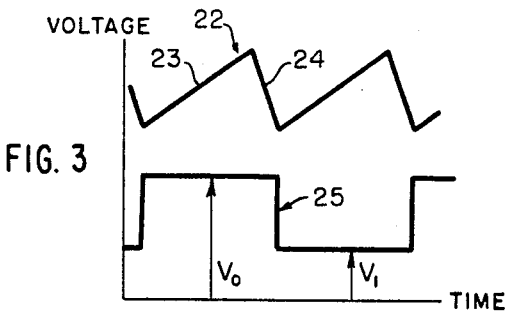
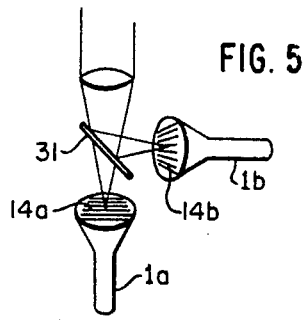
INVENTOR.
EUGENE H. SHEFTELMAN
BY
Kenway, Jenney & Hildreth
ATTORNEYS Oct. 25, 1966       E. H. SHEFTELMAN       3,281,601
CATHODE RAY TUBE DEVICE FOR TRACKING LIGHT SPOT ON TUBE FACE
Filed Oct. 11, 1963                    2 Sheets-Sheet 2

INVENTOR.
EUGENE H. SHEFTELMAN
BY
ATTORNEYS

United States Patent Office 3,281,601
Patented Oct. 25, 1966

3,281,601
CATHODE RAY TUBE DEVICE FOR TRACKING
LIGHT SPOT ON TUBE FACE
Eugene H. Sheftelman, Weston, Mass., assignor to Northrop Corporation, Beverly Hills, Calif., a corporation of California
Filed Oct. 11, 1963, Ser. No. 315,450
13 Claims. (Cl. 250—203)

The invention relates to an electronic tracking device, and more particularly to a photosensitive cathode ray tube which, when appropriately energized, will produce an electrical output signal accurately indicative of the position of a spot of light focused on the face of the tube.

Photosensitive cathode ray tubes, such as a Vidicon or an Image Orthicon, include an elongated, evacuated envelope having a transparent face at one end of the envelope behind which is positioned a sheet or layer of photosensitive material. Light striking the sheet produces an electric charge pattern on it proportional to the pattern of the strength of the light. An electronic gun is mounted at the other end of the tube and produces a stream of electrons, the primary electron beam, directed towards the photosensitive sheet at the face of the tube. Suitable focusing and deflecting members, either electrostatic or magnetic, are interposed between the electron gun and the sheet to focus the electron beam on the sheet and to sweep the beam across it in response to deflection signals applied to the deflection members. As the electron beam is swept across the sheet, it discharges the electric charge pattern. The resultant discharge current electrically represents the pattern of light striking the sheet. Such a tube may be used as an electronic tracking device to sense and track a source of light focused on the photosensitive sheet at the tube face by sensing the resultant electric pulse in the discharge current. This pulse may be correlated with the position of the primary electron beam on the sheet, as determined by the deflection signals, to indicate the location of the light spot on the tube face.

Electronic tracking devices may be used in automatic navigation equipment to automatically follow or track the position of a light source, such as a star, relative to the platform of the tracking device. The accuracy with which a photosensitive cathode ray tube tracking system, such as the one just described, will track a light source is determined to a considerable degree by the stability and linearity of the deflection signals. Any variation in the deflection signals will produce a corresponding variation, or inaccuracy, in the indicated position of the light source being tracked. While it is possible to produce stable and linear deflection signals with complex and expensive equipment, a simple, inexpensive electronic tracking device would be preferred.

An object of the present invention is to provide a relatively simple, inexpensive electronic tracking device which, when appropriately energized, will produce an electric discharge current accurately indicative of the position of a light source focused on the face of the tube regardless of the stability or linearity of the deflection signals. A further object of the present invention is to provide a novel photosensitive cathode ray tube construction which, when appropriately energized, will produce a pulsed, or digitized, electric discharge current accurately indicative of the position of a light source focused on the face of the tube. These and other objects of the invention will be apparent from the following description of preferred embodiments of the electronic tracking device.

In accordance with the principles of the invention, a simple inexpensive electronic tracking device may be provided in a cathode ray tube by mounting between the face of the tube and the electron gun three generally parallel members insulated from one another—a sheet of photosensitive material adjacent the tube face, a grid of wires, and a collector plate nearest the electron gun. Preferably the wires are coated with a material which readily emits secondary electrons when struck by a primary electron beam. The electric charge on one or more of the wires is varied by light striking the sheet of photosensitive material, and this varied charge is reflected in a varied output pulse on the collector plate as the electron beam from the electron gun is swept across the grid of wires, producing a pulse for each wire. More specifically, the velocity of the electron beam is correlated with the secondary electron emission characteristics of the wires so that, during one sweep of the electron beam across the wires, the wires are charged to a predetermined potential. Thereafter, light striking the photosensitive material varies the charge of the wire or wires in its path, which varied charge results in a varied output pulse or pulses on the collector plate during the subsequent sweep of the electron beam across the wires. The number of pulses in the output signal from the inception of the scan to the varied pulse or pulses may be counted to give the distance in number of wires from the side of the grid of wires to the light striking the tube face, thereby accurately determining the position of the light regardless of the strength or linearity of the deflection signals.

In one embodiment of the electronic tracking device, the photosensitive sheet behind the tube face comprises a photoemissive material which emits photoelectrons in response to light striking the sheet, and in another embodiment the photosensitive sheet comprises a semiconductive material which changes its impedance when struck by light.

In the embodiment of the invention utilizing a photoemissive material as the photosensitive sheet, photoelectrons emitted from the portion of the photoemissive material in the path of the light are drawn to the collector plate by a potential difference. Some of them strike the wire or wires in the path of light and spaced between the sheet of photoemissive material and the collector plate, thereby varying the charge on these wires, which is reflected in varied output pulses on the collector plate.

In the embodiment of the invention utilizing a semiconductive material as the photosensitive sheet, the grid of wires abuts the back face of the semiconductive sheet, while a charged transparent conductive coating is provided on the front face of the sheet. When light strikes the semiconductive sheet, the impedance of the portion of the sheet in the path of the light drops to a low value. This causes current to flow in this portion of the sheet between the charged coating and the wire or wires in the path of the light, thereby varying the charge on these wires, which is reflected in a varied output pulse.

Preferred embodiments of the electronic tracking device will be further described with reference to the accompanying drawings, in which:

FIG. 1 is a perspective view, partially in cross-section, of one embodiment of the electronic tracking device of the invention, with appropriate energizing and sensing circuits schematically shown;

FIG. 2 is a graph of the secondary emissive characteristics of the material coating the wires of the grid;

FIG. 3 is a graph of the energizing and deflection voltages for various conditions encountered during operation of the electronic tracking device;

FIG. 4 is a graph of a portion of a typical output signal of the electronic tracking device;

FIG. 5 is a perspective view similar to FIGURE 1 of another embodiment of the electronic tracking device;

Figure 6:
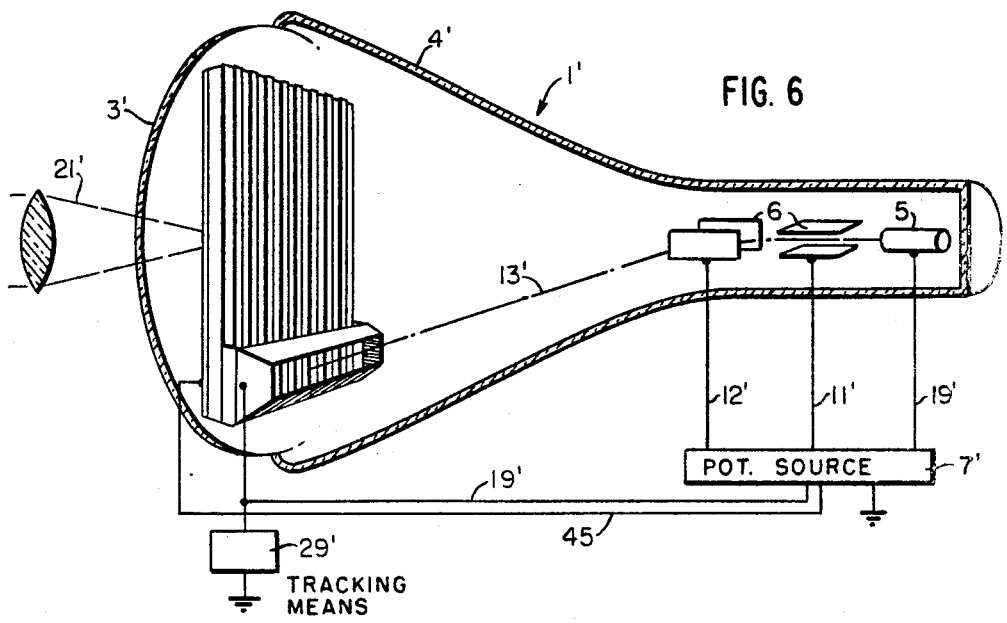
FIG. 6 is a view in cross-section of a portion of the electronic tracking device illustrated in FIGURE 5.

The embodiment of the electronic tracking device illustrated in FIGURE 1 includes a photosensitive cathode ray tube 1. A photosensitive layer 2 of a photoemissive material, such as caesium, is deposited on the transparent face 3 of the elongated, evacuated envelope 4 of the cathode ray tube 1. While the photoemissive material may be in the form of a mosaic, it need not be for the output electric signal is not derived from its discharge, and for this reason it is not necessary to isolate the photoemissive particles one from another. The photoemissive layer is connected to a source of common reference potential, or ground potential.

A conventional electron gun 5 and deflecting members 6 are mounted at the other, reduced, end of the envelope 4, the deflecting members being illustrated as electrostatic deflection plates. A source 7 of appropriate energizing and deflecting potentials is connected to a source of common potential 8, or ground potential, and to the electron gun by a conductor 9, to one set of the deflection plates by a conductor 11, and to the other set of the deflection plates by a conductor 12. The electron gun 5 is energized by the potential source 7 through conductor 9 to radiate a stream of electrons 13, an electron beam, axially down the tube between the opposed pairs of deflection plates 6 and towards the photoemissive layer 2. The deflection plates 6 are energized by the potential source 7 to correctly position and sweep the electron beam 13 generally in a single plane across the photoemissive layer 2 in a conventional manner. While two pairs of deflection plates are illustrated, only one set need be provided since the beam need be swept across the tube face only in one plane.

A grid of fine, parallel, electrically conductive wires 14 is mounted on a frame of non-conductive spacers 15 attached to the tube envelope 4, with the grid of parallel wires 14 spaced slightly from the photoemissive layer 2 and electrically insulated from one another and from the remaining structure of the tube by the spacers. An electrically conductive collector plate 16 is mounted within the tube spaced slightly from the grid of wires 14. The collector plate 16 includes an aperture 17 extending transversely across the wires, and flanges 18 about the aperture extending away from the grid of wires and toward the electron gun and deflection members. The flanges 18 conveniently may be portions of the plate 16 punched outwardly from the plate to form an aperture 17, as shown. The plate 16 is electrically connected to the potential source 7 through a conductor 19. This applies a positive anode potential with respect to ground to the plate, to attract electrons and accelerate the electron beam 13. Alternatively, or in addition, a conductive anode coating also may be provided about the sides of the envelope, if desired. The base portion 20 of the collector plate is reversely bent to extend between the portion of the wire grid in line with aperture 17 and the adjacent portion of the photoemissive layer 2, thereby shielding the photoemissive layer 2 from the electron beam 13.

Each wire of the grid of electrically conductive wires 14 is coated with a material which readily emits secondary electrons upon impingement of the primary electrons of the electron beam. An appropriate material is magnesium oxide. The secondary emission ratio characteristics of the material are shown in the graph of FIG. 2, in which the vertical ordinate indicates the secondary emission ratio of the material—the ratio of emitted secondary electrons to incident primary electrons—and the horizontal abscissa indicates the velocity of the primary electrons striking the material. This graph shows that as the velocity of the primary electrons striking the secondary emitting material increases, the secondary emission of electrons from the material also increases until a maximum emission of secondary electrons is reached at velocity $V_m$ of the primary electrons. At velocities greater than this, the secondary emission of the material decreases, which is commonly thought to be due to the fact that the primary electrons striking the material now penetrate more deeply into the material before they are absorbed. Secondary electrons so emitted deep within the material fail to reach the surface at a velocity sufficient to be emitted therefrom.

At a velocity $V_0$ of the primary electrons striking the material, the material emits one electron for each primary electron incident thereon, and the ratio of secondary electrons to primary electrons is unity. At a slower primary electron velocity $V_1$, more electrons will be emitted from the material than are emitted at velocity $V_0$, and at a faster primary electron velocity $V_2$ fewer electrons will be emitted from the material than at velocity $V_0$. Thus, at velocity $V_1$ initially there will be a net electron flow from each wire to the collector plate, or cathode, as the electron beam strikes the wire. This tends to make the wire more positive, which in turn reduces the velocity of the electron beam until it reaches a velocity $V_0$ producing an equilibrium potential on the wire. A similar action occurs at velocity $V_2$.

The secondary electrons which are radiated from the wires when they are struck by the primary electron beam 15 are attracted to the collector plate 16, which is at a positive potential, and these secondary electrons collected by the plate will vary the potential on the collector plate and conductor 19, and constitute the output signal of the electronic tracking device.

The light rays 21 from a source of light, which form an optical signal, are focused and pass through the transparent face to strike the photoemissive layer 2, causing the emission of photoelectrons from the layer. The positive potential difference between the layer 2 and the collector plate 16 attracts the emitted photoelectrons towards the plate, some of the photoelectrons striking the wires 14 between the layer and the plate making these wires more negative, and the remainder of the photoelectrons striking the plate 16.

A deflection signal is applied to the deflection plates 6 to direct the electron beam 13 through the aperture 17 in the collector plate 16 and to sweep the electron beam back and forth across the wires 14 and the photoemissive layer 2. The potential applied to the deflection plates to sweep the electron beam back and forth across the face of the tube is schematically illustrated in FIG. 3 as trace 22. The forward trace of the electron beam across the face of the tube may take about one millisecond, as indicated by the rising portion 23 of trace 22, and the retrace scan of the electron beam across the face of the tube may take about ten microseconds, as indicated by the falling portion 24 of the trace 22.

The potential difference between the collector plate 16 and the electron gun 5 is alternately raised and lowered on successive scans by the potential source 7, as indicated by the trace 25 of FIG. 3. The potential is first such as to give the electron beam a velocity equal to $V_0$ (see FIG. 2), and then a velocity equal to $V_1$ on successive scans. The capacity between any one wire and the collector plate is sufficiently small that the current of the electron beam can charge or discharge the wire to the equilibrium potential, $V_0$, in one scan.

On a scan in which the electron beam velocity is $V_1$, all wires will be charged to an equilibrium potential $V_0$. If after such a scan, light rays strike the photoemissive material 2, some of the photoelectrons emitted by the photoemissive material will be attracted to strike and be absorbed by one or more of the wires located behind the light spot. Because of the arrival of these electrons the potential of this wire or wires will be more negative than the others by some voltage $\Delta V$.

On the next scan the voltage between the cathode of the electron gun and the collector electrode is automatically raised by $(V_0-V_1)$ volts. The partial capacity of each wire to the collector system is much greater than to the cathode, hence this causes only a negligible change in potential difference between wire and collector. Just before the beam passes over a wire, the situation is as follows: the velocity of the beam approaching a wire located beneath the light spot is $V_0+(V_0-V_1)-\Delta V$. The velocity of the beam approaching any other wire is $V_0+(V_0-V_1)$. If the magnitude of $\Delta V$ is greater than the magnitude of $V_0-V_1$, then under these conditions when the beam first touches a wire, its secondary emission ratio will be greater than unity if the wire is beneath a light spot, and less than unity if the wire is not beneath a light spot. Thereafter, when the beam sweeps over the wires not in the path of light bringing them back to equilibrium potential $V_0$, a pulse of electron current flows from the collector plate 16 into the conductor 19, while as the beam passes over wires beneath light spot a pulse of electric current flows in the opposite direction. This results in a series of pulses at the collector plate of one sign relative to the equilibrium potential and current as the electron beam sweeps over wires not in the path of light, and a pulse or pulses of the opposite sign as the electron beam sweeps over a wire or wires in the path of light.

This pulsed or digitized output signal 26 appearing on the collector plate 16 is partially indicated in FIG. 4. It includes a series of pulses 27 as the wires charged to the higher potential are discharged to potential $V_0$, and one or more pulses 28 as the wires whose charge has been modified by the photoelectrons are brought to potential $V_0$. The number of pulses 27 from the inception of the scan to the pulses 28 indicates the number of wires from the inception of the scan to the pulses 28 which, in turn, indicates the distance of the light spot from the side of the wire grid. It is preferred to space the wires of grid 14 very closely to give a finer indication of the position of the light spot. As a result, more than one wire will often be negatively charged by the photoelectrons, causing more than one pulse 28 to appear in the output signal 26, as shown in FIG. 4. These negative pulses may be counted and divided by two to determine more accurately the position of the light spot on the tube face. Appropriate tracking means 29, such as an electrical pulse counting structure, may be connected between the conductor 19 and the source of common reference potential for counting the number of positive pulses 27 which occur between the inception of the scan and the negative pulse or pulses. Also, if desired, the number of negative pulses 28 may be averaged by this structure to obtain the position of the light spot on the face of the tube.

The pulsed or digitized output signal 26 of the electronic tracking device may be utilized by navigational equipment to determine the position of a light source, such as a star, on the face of the tube, and thereby to determine the position of the tube housing relative to the star.

Since the wires of grid 14 run only in one direction, movement of the light source parallel to the longitudinal direction of the wire grating will not effect the output signal 26. For this reason, the electronic tracking device just described will only track the movement of the light source in one coordinate, the direction transverse to the direction of wire grid 14. Two such tubes 1a and 1b, and a half silvered mirror 31 may be utilized to provide an electronic tracking device tracking in two coordinates if the wire gratings 14a and 14b are orthogonal, as schematically illustrated in FIG. 5.

Thus, the electronic tracking device of the present invention accurately measures one coordinate of the position of a light source focused on the face of the tube.

Two such devices will measure both coordinates. No mechanical motion is involved, and no change in accuracy results due to changes of deflection, voltage linearity, or functional relationships within the device, nor does the accuracy change during the life of the device. The accuracy of the output signal of the electronic tracking device is controlled by the physical placement of the fine wires in the grating. The output signal is in digital form, and can be read out serially or in parallel. If desired, it can be converted to a voltage proportional to the displacement by means of a standard analogue-digital converter.

From the foregoing description, it is evident that the electronic tracking device accumulates, or integrates, the amount of light falling on the tube face by accumulating a corresponding charge on the wires behind the spot of light. The scanning rate of the primary electron beam across the wire grid will be adjusted with respect to the strength of the light spot to permit sufficient photoelectrons to be ejected from the photo-emissive coating and collected by the wires. This produces a definite negative charge on the wires, which in turn will produce the desired negative output pulse on the collector plate when the wires are discharged by the primary electron beam.

Figure 7:
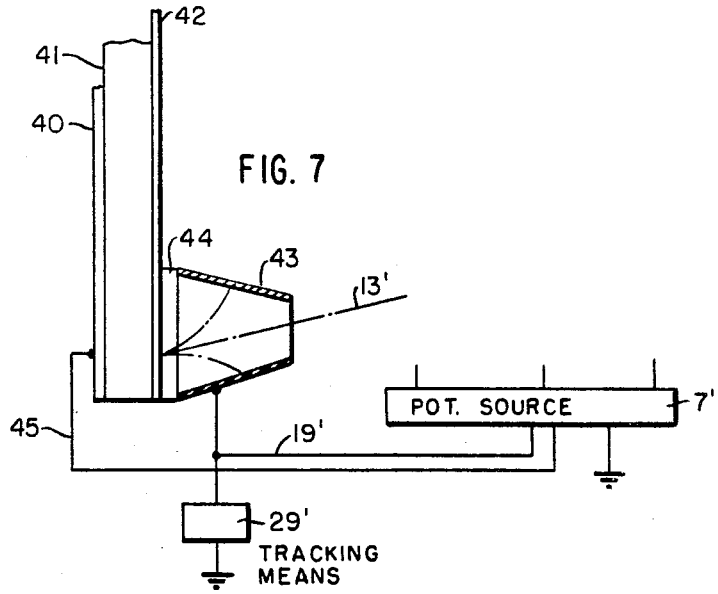
FIG. 7 is a diagrammatic illustration of the screen portion and associated components of the embodiment of the electronic tracking device shown in FIGS. 5 and 6.

The embodiment of the electronic tracking device illustrated in FIGURES 5 through 7 is generally similar to embodiment illustrated in FIGURE 1, and primed reference characters have been used to designate corresponding elements.

Behind the transparent face 3' of the evacuated tube envelope 4' is sandwiched a number of adjacent layers which comprise, reading from the tube face towards the electron gun, first a transparent electrically conductive front plate layer 40, then a sheet 41 of semiconductive material, and then a series of parallel conductive strips, or wires, 42 as shown in FIG. 7. Preferably, this sandwich is formed by coating one side of a semiconductive sheet with a transparent, electrically conductive coating, and the other side with a metal, portions of which are etched away or otherwise removed to leave a series of generally parallel metal wires bonded to the semiconductive sheet and insulated from each other and from all other components to form a grid of electrical conductors. Thus the semiconductive sheet supports and reinforces the grid of wires bonded to it. A collector plate 43, similar to flanges 18, is mounted on insulating ridges 44 spaced from the conductive strips 42 and extends transversely of the wire grid formed by the strips adjacent the bottom of the strips. A source 7' of appropriate energizing potential is electrically connected to the collector plate 43 by conductor 19' and to the transparent coating 40 by conductor 45 to selectively control the electric potentials on these members. An appropriate tracking means 29' is electrically connected to the collector plate 43.

The operation of this embodiment of the electronic tracking device is as follows. The semiconductor is a good insulator when no light falls on it. The potential difference between front and back of the sheet is raised to a high value by the scanning action of the electron beam on the conductive strips. When a spot on the front surface of the semiconductor is illuminated by light, the resistivity of the semiconductor in the region of the spot is reduced to a low value, and current flows between the charged conductive strip behind the spot and the conductive coating on the front. The potential of that strip changes as a result, while the potential of all other strips is substantially unaffected. The position of the strip with changed potential is measured by scanning across the bottoms of all strips with the electron beam. A discrete, recognizable output pulse occurs as the beam crosses the bottom of each strip, and a different output pulse occurs as the beam crosses the strip with the changed potential.

The secondary electron emission mechanism by which the conductive strips are charged and discharged is in many respects similar to that described previously with respect to FIGURE 1. It may be described as follows, designating the potential of the conductive strip with respect to the electron gun as $V_s$, the potential of the collector plate with respect to the electron gun as $V_c$, and the potential of the transparent electrically conductive layer 40 with respect to the electron gun as $V_p$. The electron beam is scanned continuously back and forth over the bottoms of the strips, the retrace being much faster than the forward scan. The collector plate potential $V_c$ is maintained constant, but the front plate potential $V_p$ is alternatively raised and lowered on successive scans. As an example, assume the equilbrium potential $V_0$ of the strips to be 1000 volts, and the collector plate potential $V_c$ to be 1100 volts. On a plus scan, the front plate potential $V_p$ is 1200 volts. Assume further that the constants are properly adjusted so that a strip can reach equilibrium during one forward or plus scan. Then after such a scan, the conductive strip potential $V_s$ will be 1000 volts. On the succeeding scan, called a minus scan, the front plate potential $V_p$ is decreased to 1100 volts. Since the partial capacities of the strips to the plate are far larger than to other components, the potential of the strips is reduced 100 volts, becoming 900 volts. As the beam sweeps over the strips, it finds each one below equilibrium potential; hence the secondary emission ratio is greater than unity and the collector current is a negative pulse. If one of the strips was illuminated, current would flow from the front plate through the illuminated portion of the semiconductive sheet to the conductive strip in the path of light, and its potential would be equal to that of the front plate, or 1100 volts. This is higher than the equilibrium potential; hence the secondary emission ratio is below unity, resulting in a positive collector current pulse. This series of negative and positive pulses forms the output signal. The strips must be separated by at least one beam width for adequate sensitivity. Therefore when the beam is not resting on a strip, it is resting on the insulating barrier between strips. If the secondary emission characteristic of this barrier is identical with that of the strips, there would be no change in collector current from strip to strip, hence no counting pulses. The secondary emission characteristic of the insulator should be quite different from that of the strips to insure pulses of adequate amplitude at each strip, which may be accomplished by coating the strips with a material which readily emits secondary electrons.

Both embodiments of the electronic tracking device are relatively simple and inexpensive, and produce pulsed output signals accurately indicative of the position of a light beam striking the face of the tube regardless of the strength and linearity of the deflection signals.

While preferred embodiments of the electronic tracking device have been described, it will be apparent to those skilled in the art that various modifications may be made within the spirit and scope of the invention without sacrficing any of the advantages.

I claim:

1. An electronic light integrator comprising at least one electrical conductor, means to selectively direct a stream of primary electrons of a controlled alternating velocity on to the electrical conductor to selectively charge the electrical conductor to one of two different values, the electrical conductor emitting secondary electrons in response to the primary electron stream, means including a photosensitive sheet between the electrical conductor and a light source for varying the charge of the electrical conductor in response to light, and an electrically conductive surface adjacent the electrical conductor to collect the secondary electrons emitted therefrom whereby light striking the photosensitive sheet varies the charge on the electrical conductor which in turn varies the quantity of secondary electrons collected by the electrically conductive surface.

2. An electronic light integrator as set forth in claim 1 including an evacuated envelope having a light transmissive face, said photosensitive sheet being positioned behind the face and between the face and said electrical conductor, and in which said electrical conductor comprises a plurality of thin, elongated, closely spaced, generally parallel electrical conductors comprising a grid defining a plane generally parallel to the photosensitive sheet.

3. An electronic light integrator as set forth in claim 2 in which each electrical conductor is coated with a material which when struck by the primary electron stream scanning across said electrical conductors readily emits a quantity of secondary electrons substantially greater than the quantity emitted by the material struck by the electron beam passing between the electrical conductors.

4. An electronic light integrator as set forth in claim 3 in which said photosensitive sheet is a photoemissive sheet which emits photoelectrons in response to light, the photoemissive sheet, the grid of electrical conductors, and the electrically conductive surface being spaced slightly from one another.

5. An electronic light integrator as set forth in claim 4 in which the electrically conductive surface is generally parallel to the grid of electrical conductors, the electrically conductive surface including an aperture extending over a portion of each of the electrical conductors and through which the stream of primary electrons may pass, the electrically conductive surface also including a reversely bent portion extending between and spaced from the photoemissive sheet and the grid of electrical conductors and laying in the path of the stream of primary electrons passing through the aperture in the electrically conductive surface.

6. In an electronic integrator which includes a grid of electrical conductors, each conductor being coated with a material for emitting secondary electrons and means to selectively direct a stream of primary electrons of a controlled alternating velocity upon said conductors to selectively charge said conductors to one of two different values, said conductors emitting secondary electrons when struck by said primary electrons in excess of those emitted as said primary beam passes between conductors, the combination of a semiconductive sheet to the back surface of which said grid is bonded, a transparent electrically conductive coating on the front surface of the semiconductive sheet, and means for varying the charge of the electrical conductors comprising means for maintaining a selected charge on the electrically conductive coating whereby when light strikes the semiconductive sheet, the portion of the sheet in the path of the light becomes conductive and current flows between the charged, electrically conductive coating and the electrical conductor or conductors in the path of the light to vary the charge on these conductors.

7. A device for tracking an optical signal comprising a cathode ray tube on which the optical signal impinges, means to energize the cathode ray tube to produce an electric output signal indicative of the position of the optical signal, and means to utilize said output signal to determine the position of said optical signal;

said cathode ray tube comprising an evacuated envelope having a light-transmissive face at one end of the envelope on which the optical signal impinges, a photosensitive sheet within the envelope and behind the face, an electron gun within the other end portion of the evacuated envelope for directing a stream of primary electrons towards the photosensitive sheet, a grid of closely spaced, generally parallel wires adjacent and insulated from the photosensitive sheet and between the photosensitive sheet and the electron gun, each wire of the grid of wires being coated with a secondary electron emitting material, and a conductive collector plate adjacent and insulated from the grid of wires and between the grid of wires and the electron gun, at least a portion of each wire being directly exposed to the primary electron stream;

said means to energize the cathode ray tube comprising means to energize the electron gun to produce a stream of primary electrons at two controlled alternating velocities to cause the secondary electron emitting material to emit secondary electrons at two different alternating ratios of secondary electrons to primary electrons, and means to cause said stream of primary electrons to sequentially strike the wires of the wire grid; and said means utilizing said electrical output signal being connected to the collector plate to utilize the varying currents on the collector plate produced by the secondary electrons from the wire grid as the wires are sequentially struck by the primary electron stream to determine the position of the optical signal impinging on the tube face and photosensitive sheet of the tube.

8. A device as set forth in claim 7 including means between the electron gun and the grid of wires for deflecting the primary electron stream to sequentially and repetitively impinge on each of said wires, said means to control the velocity of the primary electron stream being correlated with said means energizing the deflecting means to accelerate the primary electron stream alternately to a velocity during one scan of the wires sufficient to charge all of the wires to a common reference potential and then to a velocity during a subsequent scan of the wires sufficient to charge all of the wires to a potential positive with respect to the common reference potential whereby during the positive state of the wires light striking the photosensitive sheet effects a discharge of the wires in the path of light to a potential negative with respect to the common reference potential which produces a signal on the collector plate negative with respect to the positively charged wires during a subsequent scan when the electron stream is at a velocity sufficient to charge all of the wires to said common reference potential.

9. A device as set forth in claim 8 in which the velocity of the primary electron stream is correlated with the characteristics of the secondary electron emissive material so that one of said ratios is unity and the other of said ratios is greater than unity.

10. A device as set forth in claim 8 including two of said cathode ray tubes, said energizing means energizing both cathode ray tubes, the grid of wires of the first tube being orthogonal to the grid of wires to the second tube, and means for splitting the optical signal into two beams, the first beam being directed onto the first tube and the second beam being directed onto the second tube whereby the device electronically tracks movement of the optical signal in two coordinates.

11. A device as set forth in claim 8 in which said photosensitive sheet is a photoemissive sheet which emits photoelectrons in response to the optical signal, the photoemissive sheet, the grid of electrical conductors, and the electrically conductive surface being spaced slightly from one another.

12. A device as set forth in claim 11 in which the electrically conductive surface is generally parallel to the grid of electrical conductors, the electrically conductive surface including an aperture extending over a portion of each of the electrical conductors and through which the stream of primary electrons may pass, the electrically conductive surface also including a reversely bent portion extending between and spaced from the photoemissive sheet and the grid of electrical conductors and laying in the path of the stream of primary electrons passing through the aperture in the electrically conductive surface.

13. In an electronic integrator which includes a grid of electrical conductors, each conductor being coated with a material for emitting secondary electrons and means to selectively direct a stream of primary electrons of a controlled alternating velocity upon said conductors to selectively charge said conductors to one of two different values, said conductors emitting secondary electrons when struck by said primary electrons in excess of those emitted as said primary beam passes between conductors, the combination of a semiconductive sheet to the back surface of which said grid is bonded, a transparent electrically conductive coating on the front surface of the semiconductive sheet, and means for varying the charge of the electrical conductors including means for maintaining a selected charge on the electrically conductive coating whereby when an optical signal strikes the semiconductive sheet, the portion of the sheet in the path of the optical signal becomes conductive and current flows between the charged, electrically conductive coating and the electrical conductor or conductors in the path of the optical signal to vary the charge on these conductors.

References Cited by the Examiner

UNITED STATES PATENTS

| | | | |
|---|---|---|---|
| 2,892,949 | 6/1959 | Hardy | 250—203 X |
| 2,908,836 | 10/1959 | Henderson | 313—68 |
| 3,039,002 | 6/1962 | Cuerth | 250—203 |
| 3,175,089 | 3/1965 | Talley et al. | 250—203 |

RALPH G. NILSON, *Primary Examiner.*
WALTER STOLWEIN, *Examiner.*